(12) United States Patent  (10) Patent No.: US 8,970,692 B2
Tiao et al.  (45) Date of Patent: Mar. 3, 2015

(54) HEAD MOUNT PERSONAL COMPUTER AND INTERACTIVE SYSTEM USING THE SAME

(75) Inventors: Golden Tiao, Hsinchu County (TW); Tzuan-Ren Jeng, Hsinchu (TW); Hsien-Chang Lin, Taipei (TW); Chun-Jung Chen, Hsinchu County (TW); Wen-Chao Chen, Kaohsiung (TW); Chun-Chuan Lin, Hsinchu (TW); Chao-Hsu Tsai, Hsinchu (TW); Kuo-Chung Huang, Taipei (TW); Hsin-Hsiang Lo, Hsinchu County (TW); Chu-Hsun Lin, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 455 days.

(21) Appl. No.: 13/410,305

(22) Filed: Mar. 2, 2012

(65) Prior Publication Data

US 2013/0057679 A1   Mar. 7, 2013

Related U.S. Application Data

(60) Provisional application No. 61/529,933, filed on Sep. 1, 2011.

(30) Foreign Application Priority Data

Dec. 16, 2011  (TW) .............................. 100146907 A

(51) Int. Cl.
 *H04N 7/18*  (2006.01)
 *G09G 5/00*  (2006.01)

(52) U.S. Cl.
 CPC ... *G09G 5/00* (2013.01); *H04N 7/18* (2013.01)
 USPC .......................................... 348/135; 345/156

(58) Field of Classification Search
 CPC .................................. G09G 5/00; H04N 7/18
 USPC ........... 348/135, 790, 333; 345/156, 633, 175
 See application file for complete search history.

(56) References Cited

U.S. PATENT DOCUMENTS 6,121,953 A * 9/2000 Walker .......................... 345/156
6,161,932 A * 12/2000 Goto et al. ..................... 351/208

(Continued)

FOREIGN PATENT DOCUMENTS

TW  201003586  1/2010
TW  201104651  2/2011

OTHER PUBLICATIONS

"Notive of allowance of Taiwan Counterpart Application", issued on Mar. 26, 2014, p. 1-p. 4.

(Continued)

*Primary Examiner* — Behrooz Senfi
(74) *Attorney, Agent, or Firm* — Jianq Chyun IP Office

(57) ABSTRACT

A head mount personal computer (HMPC) and an interactive system using the same are provided. The provided HMPC includes a microprocessing unit, an output unit and an image capture unit with a distance detection function (ICWDD). The microprocessing unit is served as an operation core of the HMPC. The output unit is coupled to and controlled by the microprocessing unit, and configured to project an optical image onto a space. The ICWDD is coupled to and controlled by the microprocessing unit, and configured to capture operation gestures on the projected optical image from a user wearing the HMPC, such that the microprocessing unit correspondingly controls operations of the HMPC in response to the operation gestures on the projected optical image from the user.

45 Claims, 7 Drawing Sheets

(56) References Cited

U.S. PATENT DOCUMENTS

| | | |
|---|---|---|
| 6,271,808 B1 | 8/2001 | Corbin |
| 6,304,303 B1 | 10/2001 | Yamanaka |
| 6,329,965 B1 | 12/2001 | Lee |
| 6,903,876 B2 * | 6/2005 | Okada et al. ............ 359/633 |
| RE42,336 E | 5/2011 | Fateh et al. |
| 2001/0006376 A1 | 7/2001 | Numa |
| 2002/0057280 A1 * | 5/2002 | Anabuki et al. ............ 345/633 |
| 2007/0058261 A1 | 3/2007 | Sugihara et al. |
| 2008/0278821 A1 * | 11/2008 | Rieger .................... 359/630 |
| 2011/0148755 A1 * | 6/2011 | Lee et al. ................. 345/156 |
| 2011/0199582 A1 | 8/2011 | Kuriki et al. |
| 2011/0213664 A1 | 9/2011 | Osterhout et al. |
| 2012/0092300 A1 * | 4/2012 | Wang et al. .............. 345/175 |
| 2012/0105473 A1 * | 5/2012 | Bar-Zeev et al. ......... 345/633 |

OTHER PUBLICATIONS

Pausch et al., "A User Study Comparing Head-Mounted and Stationary Displays", IEEE Symposium on Research Frontiers in Virtual Reality, Oct. 1993, p. 41-45.

Kiyokawa, "A Wide Field-of-view Head Mounted Projective Display using Hyperbolic Half-silvered Mirrors",. ISMAR 2007. 6th IEEE and ACM International Symposium on Mixed and Augmented Reality, Nov. 13-16, 2007, p. 207-210.

Ge et al., "VLSI Design of 3D Display Processing Chip for Head-Mounted Display", International IEEE Consumer Electronics Society's Games Innovations Conference, Aug. 25-28, 2009, p. 25-28.

Nagahara et al., "Wide Field of View Head Mounted Display for Tele-presence with An Omnidirectional Image Sensor", Conference on Computer Vision and Pattern Recognition Workshop, Jun. 16-22, 2003, p. 86-86.

* cited by examiner

HEAD MOUNT PERSONAL COMPUTER AND INTERACTIVE SYSTEM USING THE SAME

CROSS-REFERENCE TO RELATED APPLICATION

This application claims the priority benefits of U.S. provisional application Ser. No. 61/529,933, filed on Sep. 1, 2011 and Taiwan application serial no. 100146907, filed on Dec. 16, 2011. The entirety of each of the above-mentioned patent applications is hereby incorporated by reference herein and made a part of this specification.

TECHNICAL FIELD

The disclosure relates to a computer device, and more particularly, to a head mount personal computer and an interactive system using the same.

BACKGROUND

Man-machine-environments have been developed from past host computers to current personal computers for half a century. Human life cannot exist without the computer world due to the rapid advancing of computers which provide high-speed calculation and large storage capability together with large networks. The man-machine interface (MMI) of past computers or handheld electronic devices mostly adopt keyboards and/or mice to serve as an input device, but the MMI of current computers or handheld electronic devices are changed by using a touch panel to serve as the input device. Obviously, in order to control the computer or the handheld electronic device, the physical input device such as the keyboard, the mouse, or the touch panel is required to be equipped in the computer or the handheld electronic device. Regardless of using either the keyboard, the mouse, or the touch panel that serve as the physical input device, when a user operates the computer or the handheld electronic device, anyone can see the operation contents corresponding to the computer or the handheld electronic device from the user. In other words, the input between the user and the computer or the handheld electronic device does not have privacy.

SUMMARY

An exemplary embodiment of the disclosure provides an interactive system including a first head mount personal computer, wherein the first head mount personal computer includes a first microprocessing unit, a first output unit and a first image capture unit with a distance detection function. The first microprocessing unit is configured to be served as an operation core of the first head mount personal computer. The first output unit is coupled to and controlled by the first microprocessing unit, and configured to project a first optical image onto a space. The first image capture unit is coupled to and controlled by the first microprocessing unit, and configured to capture operation gestures on the projected first optical image from a first user wearing the first head mount personal computer. The first microprocessing unit correspondingly controls operations of the first head mount personal computer in response to the operation gestures on the projected first optical image from the first user.

In an exemplary embodiment of the disclosure, the provided interactive system further includes a second head mount personal computer, wherein the second head mount personal computer includes a second microprocessing unit, a second output unit and a second image capture unit with a distance detection function. The second microprocessing unit is configured to be served as an operation core of the second head mount personal computer. The second output unit is coupled to and controlled by the second microprocessing unit, and configured to project a second optical image onto the space. The second image capture unit is coupled to and controlled by the second microprocessing unit, and configured to capture operation gestures on the projected second optical image from a second user wearing the second head mount personal computer. The second microprocessing unit correspondingly controls operations of the second head mount personal computer in response to the operation gestures on the projected second optical image from the second user.

In an exemplary embodiment of the disclosure, both the first and the second head mount personal computers respectively include a wireless communication module for communicating therebetween.

In an exemplary embodiment of the disclosure, the projected first and second optical images on the space are two real or virtual optical images, wherein both the real or virtual optical images are not interfered with one another.

In an exemplary embodiment of the disclosure, the first microprocessing unit becomes a master microprocessing unit when the first head mount personal computer is set to a master device and the second head mount personal computer is set to a slave device, such that the first microprocessing unit is configured to: control the whole operations of the first and the second head mount personal computers; make the first and the second users see a same real or virtual optical image; and control correspondingly the operations of the first and the second head mount personal computers in response to the operation gestures on the same real or virtual optical image from the first user and/or the second user. On the contrary, the second microprocessing unit becomes a master microprocessing unit when the first head mount personal computer is set to a slave device and the second head mount personal computer is set to a master device, such that the second microprocessing unit is configured to: control the whole operations of the first and the second head mount personal computers; make the first and the second users see a same real or virtual optical image; and control correspondingly the operations of the first and the second head mount personal computers in response to the operation gestures on the same real or virtual optical image from the first user and/or the second user.

Another exemplary embodiment of the disclosure provides a head mount personal computer including a microprocessing unit, an output unit and an image capture unit with a distance detection function. The microprocessing unit is configured to be served as an operation core of the head mount personal computer. The output unit is coupled to and controlled by the microprocessing unit, and configured to project an optical image onto a space. The image capture unit is coupled to and controlled by the microprocessing unit, and configured to capture operation gestures on the projected optical image from a user wearing the head mount personal computer. The microprocessing unit correspondingly controls operations of the head mount personal computer in response to the operation gestures on the projected optical image from the user.

A further exemplary embodiment of the disclosure provides a head mount personal computer including a microprocessing unit and an output unit. The microprocessing unit is configured to be served as an operation core of the head mount personal computer. The output unit is coupled to and controlled by the microprocessing unit, and configured to project an optical image onto a space. The microprocessing unit correspondingly controls operations of the head mount personal computer in response to operation gestures on the projected optical image from a user wearing the head mount personal computer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
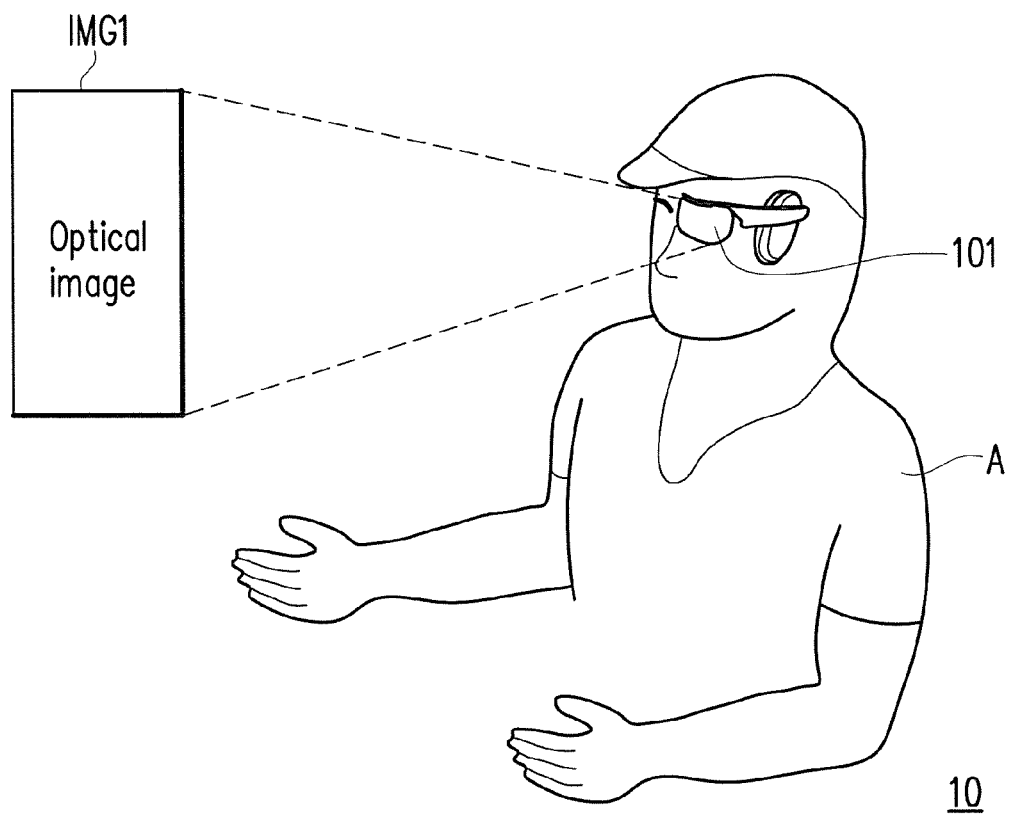
FIG. 1A and FIG. 1B are respectively a diagram of an interactive system 10 according to an exemplary embodiment of the disclosure.

Reference will now be made in detail to the exemplary embodiments of the disclosure, examples of which are illustrated in the accompanying drawings. Wherever possible, the same reference numbers are used in the drawings and the description to refer to the same or similar parts.

Figure 1B:
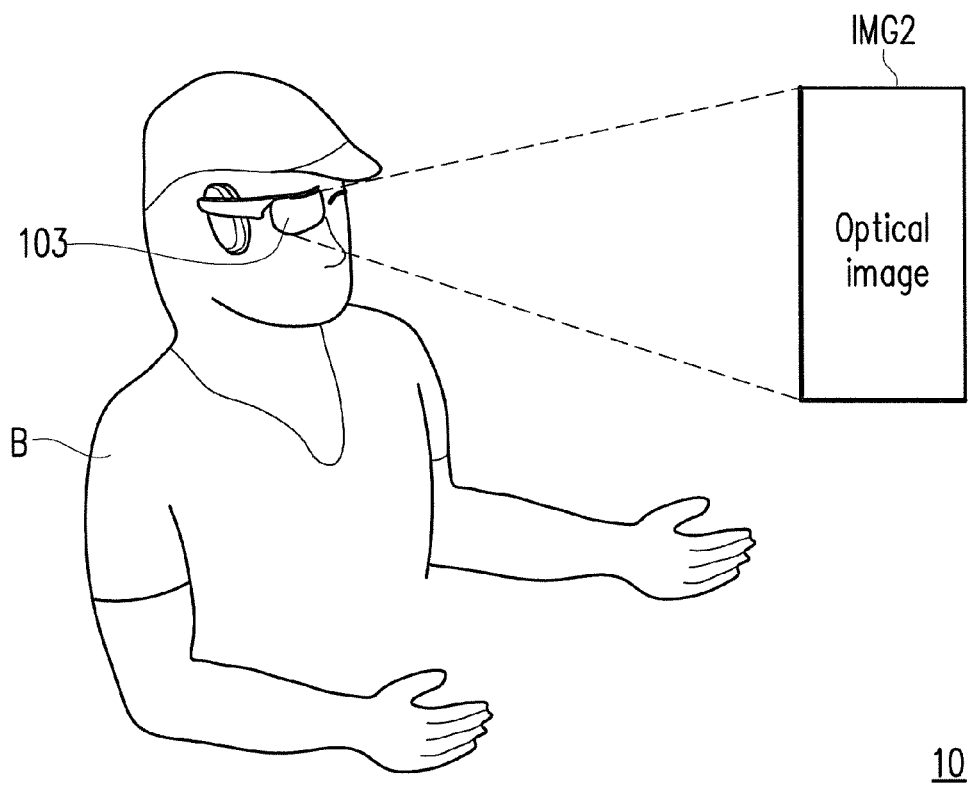

FIG. 1A and FIG. 1B are respectively a diagram of an interactive system 10 according to an exemplary embodiment of the disclosure. Referring to FIGS. 1A and 1B, the interactive system 10 may include two head mount personal computers (HMPCs) 101 and 103 both having similar configurations. In this exemplary embodiment, the head mount personal computer 101 may be worn on the head of the user A, so as to project, when the head mount personal computer 101 is booted, an optical image IMG1 onto any space to be served as a (virtual) man-machine interface (MMI) provided for the user A to control the head mount personal computer 101. Similarly, the head mount personal computer 103 may be worn on the head of the user B, so as to project, when the head mount personal computer 103 is booted, an optical image IMG2 onto any space to be served as a (virtual) MMI provided for the user B to control the head mount personal computer 103.

Figure 2:
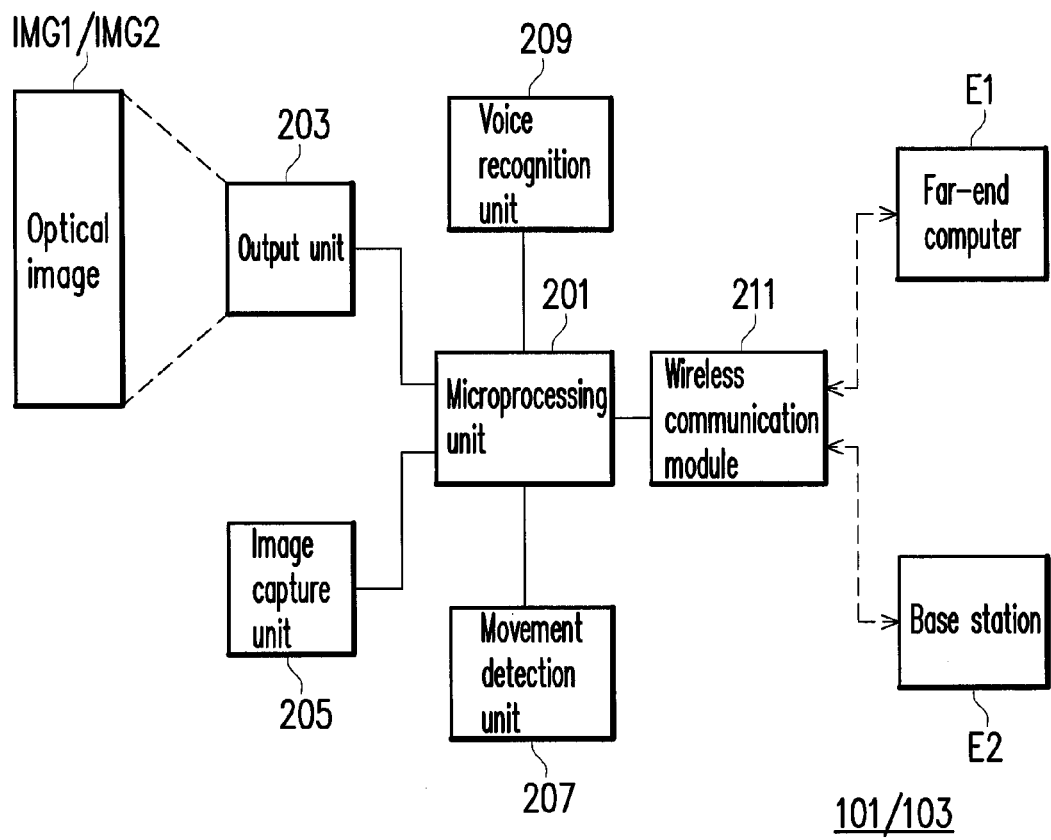
FIG. 2 is an embodiment diagram of the head mount personal computer 101/103 in FIG. 1A and FIG. 1B.

To be specific, FIG. 2 is an embodiment diagram of the head mount personal computer 101/103 in FIG. 1A and FIG. 1B. Referring to FIGS. 1A, 1B and 2, each of the head mount personal computers 101/103 includes a microprocessing unit 201, an output unit 203, an image capture unit with a distance detection function 205, a movement detection unit 207, a voice recognition unit 209 and a wireless communication module 211.

In this exemplary embodiment, the microprocessing unit 201 is configured to be served as the operation core of the head mount personal computer 101/103. The output unit 203 is coupled to and controlled by the microprocessing unit 201, and configured to project the optical image IMG1/IMG2 onto any space. The image capture unit with the distance detection function 205 is coupled to and controlled by the microprocessing unit 201, and configured to capture operation gestures on the projected optical image IMG1/IMG2 from the user A/B wearing the head mount personal computer 101/103. Accordingly, the microprocessing unit 201 may correspondingly control operations of the head mount personal computer 101/103 in response to the operation gestures on the projected optical image IMG1/IMG2 from the user A/B.

In this exemplary embodiment, the image capture unit 205 may further have a variable visual angle function and a variable focal function, such that the image capture unit 205 may be implemented by an active depth camera, but not limited thereto (i.e. the image capture unit 205 may also be implemented by a passive depth camera), and the implementation thereof may use "the optical path adjustment device", for example, adjusting the optical path by the liquid crystal, or mechanically adjusting a distance between the lens modules. This way, the image capture unit 205 may achieve a wider and more accurate depth detection in space.

The movement detection unit 207 is coupled to and controlled by the microprocessing unit 201, and configured to detect the A/B user's eye motion. For example, the movement detection unit 207 may include a single/dual eye location detector, such that by using the single/dual eye location detector, the A/B user's eye movement location can be obtained and the A/B user's vision focus point also can be calculated. Accordingly, the microprocessing unit 201 can correspondingly control the operations of the head mount personal computer 101/103 in response to the A/B user's eye motion.

In addition, in order to avoid the optical image IMG1/IMG2 projected onto the space and from the output unit 203 producing shaking excessively due to the A/B user's head motion. In this exemplary embodiment, the movement detection unit 207 may be further configured to detect the A/B user's head motion. For example, the movement detection unit 207 may include a gyroscope or the like, by using the gyroscope or the like, the A/B user's head motion (e.g. rotation, movement or shock) can be obtained and calculated. Accordingly, the microprocessing unit 201 can be configured to compensate the output unit 203 in response to the A/B user's head motion, so as to make the projected optical image IMG1/IMG2 stably project onto the space without influencing the A/B user's head motion.

It should be noted that the mechanism of compensating the output unit 203 belongs to the hardware real-time operation of the local-end head mount personal computer 101/103, such that the microprocessing unit 201 has to compensate the output unit 203 at real time in response to the A/B user's head motion. Of course, the microprocessing unit 201 has to correspondingly control the operations of the head mount personal computer 101/103 at real time in response to any other hardware real-time operations relating to the local-end head mount personal computer 101/103, for example, operation gestures, eye motion and/or input voices.

The voice recognition unit 209 is coupled to and controlled by the microprocessing unit 201, and configured to receive and recognize input voices from the user A/B. Accordingly, the microprocessing unit 201 can be further configured to correspondingly control the operations of the head mount personal computer 101/103 in response to the input voices from the user A/B. Obviously, the microprocessing unit 201 may be configured to correspondingly control the operations of the head mount personal computer 101/103 at real time in response to at least one of or a combination of the operation gestures from the user A/B, the A/B user's eye motion and the input voices from the user A/B.

The wireless communication module 211 is coupled to and controlled by the microprocessing unit 201, and configured to make the head mount personal computer 101/103 have a wireless connection function. Accordingly, because of the wireless communication module 211, the head mount personal computers 101 and 103 can communicate with one another, and further can connect with some external devices such as, shown in FIG. 2, the far-end computer E1, the (communication) base station (BS), . . . , etc., but not limited thereto.

From the above, taking the application of a single head mount personal computer 101/103 as an example, when the head mount personal computer 101/103 wearing on the head of the user A/B is booted, the microprocessing unit 201 would control the output unit 203 to project the real (public) or virtual (private) optical image IMG1/IMG2 onto the space, and the projected optical image IMG1/IMG2 is served as the (virtual) MMI (for example, virtual keyboard, virtual screen, virtual mouse, etc., but not limited thereto) provided for the user A/B to control the head mount personal computer 101/103. Herein, the projected optical images IMG1 and IMG2 on the space can be determined by the actual application, and may be two real (public) or virtual (private) optical images which are not interfered with one another.

Obviously, due to the optical image IMG1/IMG2 projected by the output unit 203, the head mount personal computer 101/103 of this exemplary embodiment does not have to be equipped with any traditional physical input device therein. Accordingly, the microprocessing unit 201 can correspondingly control the operations of the head mount personal computer 101/103 by capturing the operation gestures on the projected optical image IMG1/IMG2 from the user A/B through the image capture unit 205, or by detecting the A/B user's eye motion through the movement detection unit 207, or by recognizing the input voices from the user A/B through the voice recognition unit 209.

It should be noted that if the optical image IMG1/IMG2 projected onto the space and from the output unit 203 is the real (public) optical image, all people in the space can see the optical image IMG1/IMG2 projected onto the space and from the output unit 203 at the same time. In this case, it is specifically suitable for the public meeting occasions. In addition, if the optical image IMG1/IMG2 projected onto the space and from the output unit 203 is the virtual (private) optical image, no one can see the optical image IMG1/IMG2 projected onto the space and from the output unit 203 except for the user A/B, so as to make the input between the user A/B and the head mount personal computer 101/103 have the privacy. In this case, it is specifically suitable for confidential/private meeting occasions.

On the other hand, in order to easily and conveniently wear the head mount personal computer 101/103 on the head of the user A/B, in this exemplary embodiment, the head mount personal computer 101/103 may have the wireless connection function to connect with the external far-end computer E1 due to the wireless communication module 211. Accordingly, when the microprocessing unit 201 determines that the operations of the head mount personal computer 101/103 belongs to the non-real time operations (i.e. the software real-time operations requiring a large number of data for operating), for example, playing the movies, but not limited thereto, the microprocessing unit 201 can wirelessly connect with the far-end computer E1 through the wireless communication module 201, and use the far-end computer E1 for performing data calculation and storage. In other words, the calculation and storage capabilities of the head mount personal computer 101/103 can be spread over the far-end computer E1, so as to reduce the weight of the head mount personal computer 101/103 wearing on the head of the user A/B.

In the other applications for a single head mount personal computer 101/103, the head mount personal computer 101/103 may have the wireless connection function to connect with the external (communication) base station (BS) E2 due to the wireless communication module 211. Accordingly, the microprocessing unit 201 can wirelessly connect with the base station E2 through the wireless communication module 211 for performing a communication service. In this case, the optical image IMG1/IMG2 projected onto the space and from the output unit 203 can be shown as a cellular phone appearance, such that the user A/B only has to operate on the projected cellular phone, or stare at the numbers on the projected cellular phone through eyes, or directly speak the input voice of the telephone number. Therefore, the microprocessing unit 201 would wirelessly connect with the base station E2 through the wireless communication module 211 for providing the communication service to the user A/B.

Figure 3A:
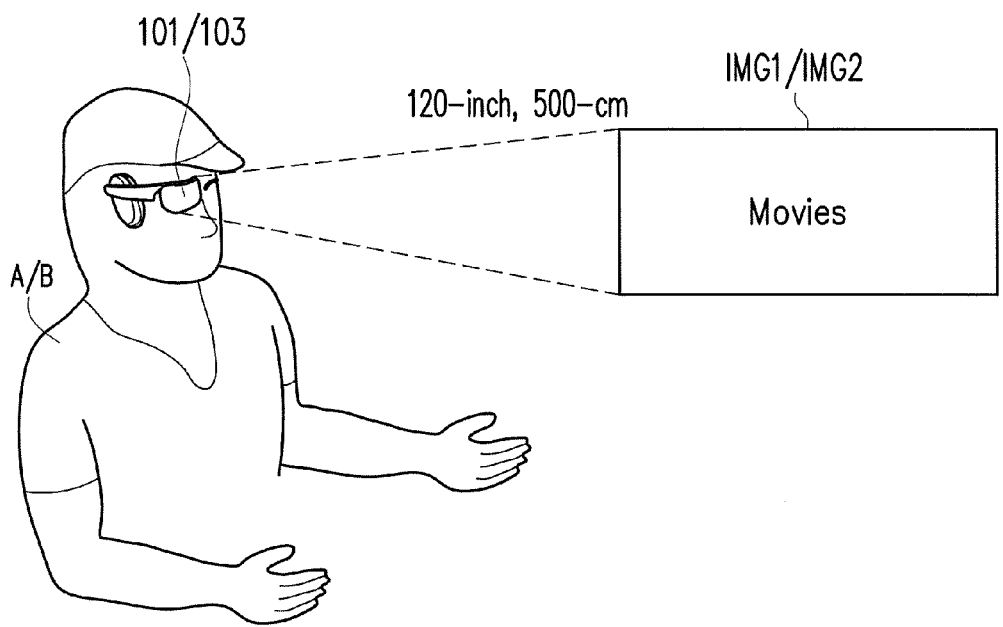
FIGS. 3A to 3D are diagrams of the projected optical images IMG1/IMG2 with different image contents.

In this exemplary embodiment, the microprocessing unit 201 may determine an imaging distance, an imaging size and an imaging transparency of the projected optical image IMG1/IMG2 on the space according to contents of the projected optical image IMG1/IMG2. For example, assuming that the contents of the projected optical image IMG1/IMG2 is "movies", the microprocessing unit 201 may control the output unit 203 to project, as shown in FIG. 3A, the optical image IMG1/IMG2 with the contents of "movies" onto the space, wherein a distance between the user A/B and the projected optical image IMG1/IMG2 with the contents of "movies" (i.e. the imaging distance) is, for example, 500-cm; a size of the projected optical image IMG1/IMG2 with the contents of "movies" (i.e. the imaging size) is, for example, 120-inch; and the transparency of the projected optical image IMG1/IMG2 with the contents of "movies" (i.e. the imaging transparency) is, for example, in the non-transmittance mode, but not limited thereto.

Figure 3B:
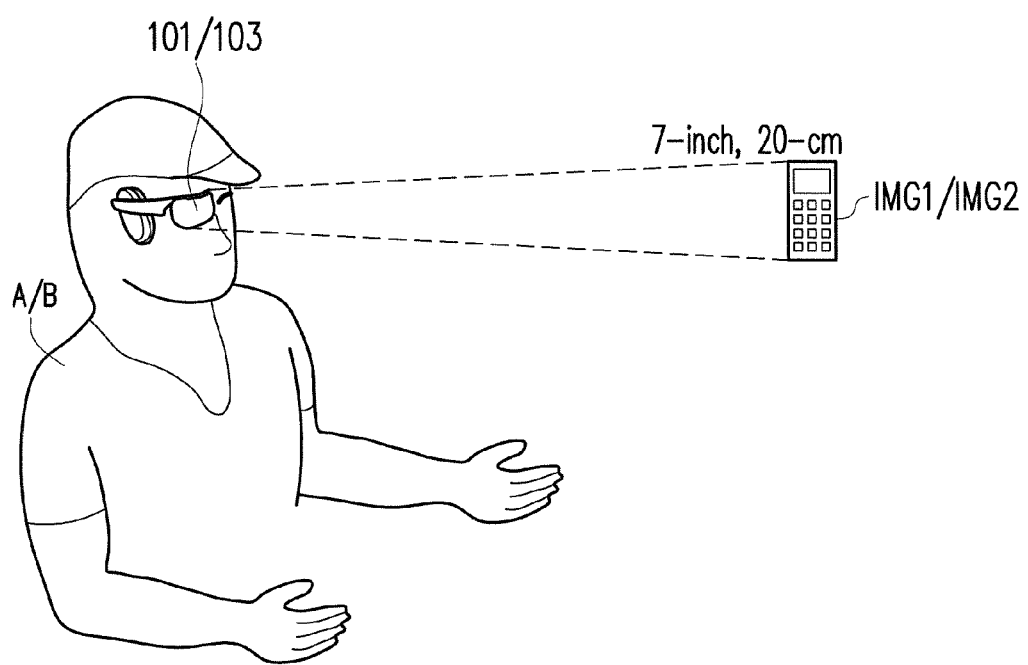
Figure 3C:
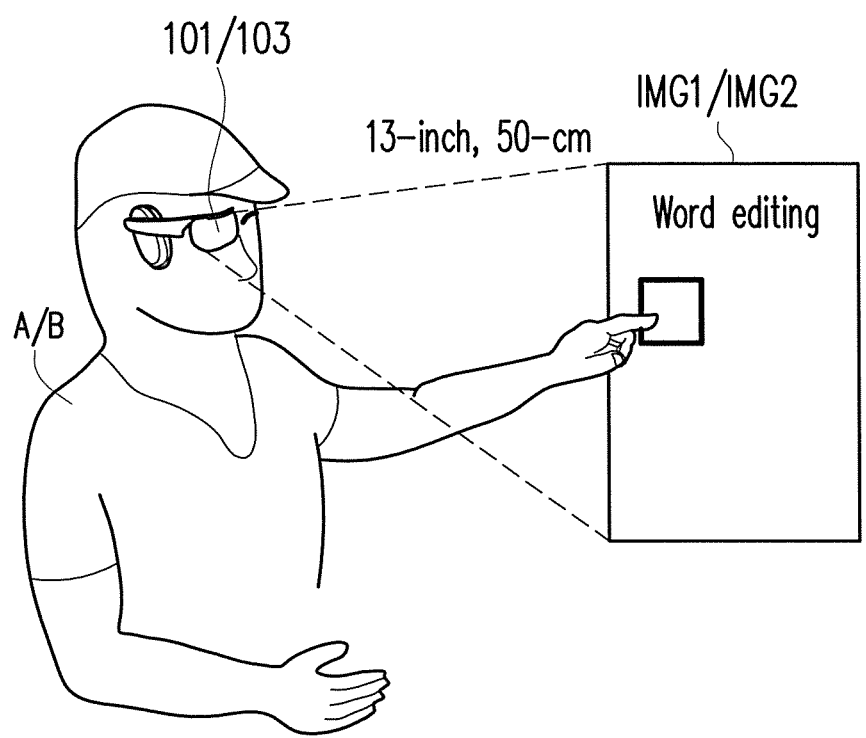

In addition, assuming that the contents of the projected optical image IMG1/IMG2 is "cellular phone", the microprocessing unit 201 may control the output unit 203 to project, as shown in FIG. 3B, the optical image IMG1/IMG2 with the contents of "cellular phone" onto the space, wherein a distance between the user A/B and the projected optical image IMG1/IMG2 with the contents of "cellular phone" (i.e. the imaging distance) is, for example, 20-cm; a size of the projected optical image IMG1/IMG2 with the contents of "cellular phone" (i.e. the imaging size) is, for example, 7-inch; and the transparency of the projected optical image IMG1/IMG2 with the contents of "cellular phone" (i.e. the imaging transparency) is, for example, in the transmittance mode, but not limited thereto. Even, assuming that the contents of the projected optical image IMG1/IMG2 is "word editing", the microprocessing unit 201 may control the output unit 203 to project, as shown in FIG. 3C, the optical image IMG1/IMG2 with the contents of "word editing" onto the space, wherein a distance between the user A/B and the projected optical image IMG1/IMG2 with the contents of "word editing" (i.e. the imaging distance) is, for example, 50-cm; a size of the projected optical image IMG1/IMG2 with the contents of "word editing" (i.e. the imaging size) is, for example, 13-inch; and the transparency of the projected optical image IMG1/IMG2 with the contents of "word editing" (i.e. the imaging transparency) is, for example, in the non-transmittance mode, but not limited thereto. The imaging distance, the imaging size and the imaging transparency of the projected optical image IMG1/IMG2 on the space can be determined by the real application.

Figure 3D:
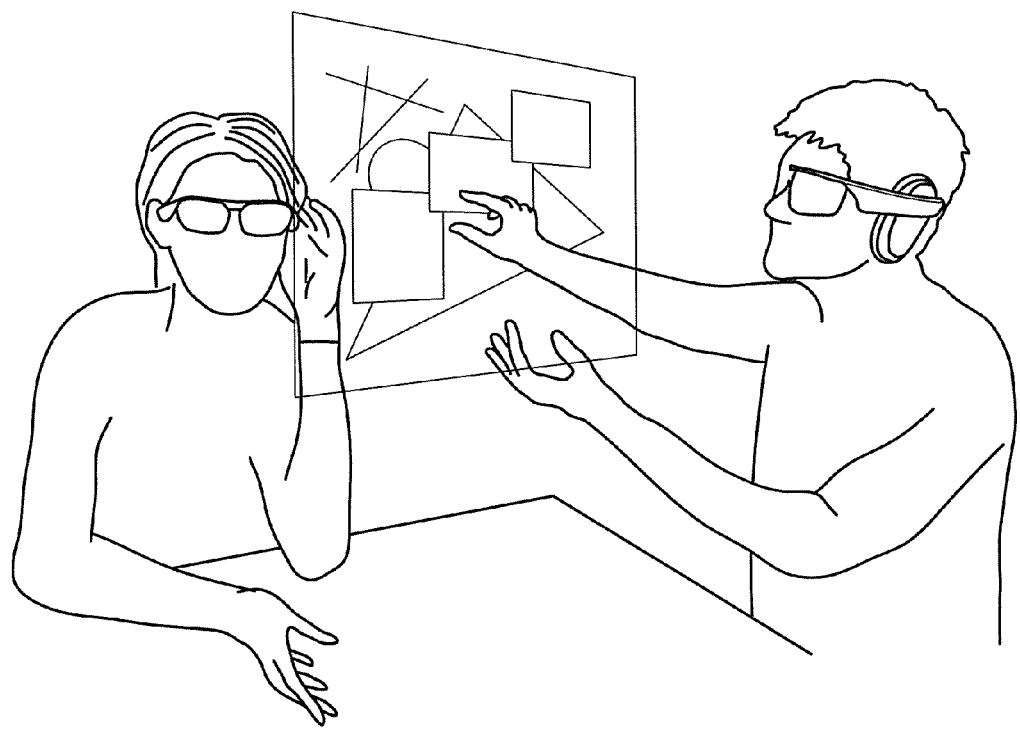

On the other hand, taking the application of dual head mount personal computers 101 and 103 as an example, both the head mount personal computers 101 and 103 can be communicated with one another due to each of the head mount personal computers 101 and 103 has the wireless communication module 211. In this case, the microprocessing unit 201 of the head mount personal computer 101 becomes a master microprocessing unit when the head mount personal computer 101 is set to a master device and the head mount personal computer 103 is set to a slave device, such that the microprocessing unit 201 of the head mount personal computer 101 can be configured to: control the whole operations of the head mount personal computers 101 and 103; make the users A and B see a same real or virtual optical image; and control correspondingly the operations of the head mount personal computers 101 and 103 in response to the operation gestures on the same real or virtual optical image from the user A and/or the user B, as shown in FIG. 3D.

On the contrary, the microprocessing unit 201 of the head mount personal computer 103 becomes a master microprocessing unit when the head mount personal computer 101 is set to a slave device and the head mount personal computer 103 is set to a master device, such that the microprocessing unit 201 of the head mount personal computer 103 can be configured to: control the whole operations of the head mount personal computers 101 and 103; make the users A and B see a same real or virtual optical image; and control correspondingly the operations of the head mount personal computers 101 and 103 in response to the operation gestures on the same real or virtual optical image from the user A and/or the user B. Accordingly, the users A and B can see the same real or virtual optical image in the same space for discussing and communicating. Of course, if the users A and B saw the same virtual optical image in the same space, not everyone can see the projected virtual optical image except for the users A and B, such that it is specifically suitable for confidential/private meeting occasions/situations.

Herein, even though the above exemplary embodiments take two head mount personal computers 101 and 103 for explaining and illustrating, the disclosure is not limited thereto. In other words, based on the disclosure/teaching of the above exemplary embodiments, the embodiments relating to three or more of the above head mount personal computers for communicating therebetween can be analogized/deduced by one person having ordinary skill in the art, so the details thereto are omitted.

In summary, the head mount personal computer of the disclosure may have a plurality of purposes, such as for entertainment, working, and communication, etc., and does not have to equip any physical input device for achieving the purpose of controlling the computer due to the projected optical image that can be used and served as the (virtual) MMI provided for controlling the head mount personal computer, so as to achieve the purpose of convenience and environmentalism. Also, the projected optical image used and served as the (virtual) MMI provided for controlling the head mount personal computer can be the virtual optical image, such that the input between the user and the computer may have privacy.

From a different perspective, the disclosure submits a novel MMI including a novel virtual main-machine interactive (i.e. the air touch) and a novel data display fitted with human factors. The submitted novel MMI is different from the existing computers and the handheld electronic devices which can not get out of adopting a concept of miniaturizing the original personal computer. All existing computers and the handheld electronic devices can be replaced with the head mount personal computer submitted by the disclosure, and the purposes of simplicity, convenience, portability and environmentalism can be achieved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An interactive system, comprising:
a first head mount personal computer, comprising:
a first microprocessing unit, configured to be served as an operation core of the first head mount personal computer;
a first output unit, coupled to and controlled by the first microprocessing unit, configured to project a first optical image onto a space; and
a first image capture unit with a distance detection function, coupled to and controlled by the first microprocessing unit, configured to capture operation gestures on the projected first optical image from a first user wearing the first head mount personal computer,
wherein the first microprocessing unit correspondingly controls operations of the first head mount personal computer in response to the operation gestures on the projected first optical image from the first user.

2. The interactive system according to claim 1, wherein the first head mount personal computer further comprises:
a movement detection unit, coupled to and controlled by the first microprocessing unit, configured to detect the first user's head motion,
wherein the first microprocessing unit is further configured to compensate the first output unit in response the first user's head motion, so as to make the projected first optical image stably project onto the space.

3. The interactive system according to claim 2, wherein the movement detection unit is further configured to detect the first user's eye motion, and the first microprocessing unit is further configured to correspondingly control the operations of the first head mount personal computer in response to the first user's eye motion.

4. The interactive system according to claim 3, wherein the first head mount personal computer further comprises:
a voice recognition unit, coupled to and controlled by the first microprocessing unit, configured to receive and recognize input voices from the first user,
wherein the first microprocessing unit is further configured to correspondingly control the operations of the first head mount personal computer in response to the input voices from the first user.

5. The interactive system according to claim 4, wherein the first microprocessing unit is further configured to correspondingly control the operations of the first head mount personal computer at real time in response to at least one of or a combination of the operation gestures from the first user, the first user's eye motion and the input voices from the first user.

6. The interactive system according to claim 4, wherein the first head mount personal computer further comprises:
a wireless communication module, coupled to and controlled by the first microprocessing unit, configured to make the first head mount personal computer have a wireless connection function.

7. The interactive system according to claim 6, wherein the first microprocessing unit wirelessly connects with a far-end computer through the wireless communication module, so as to use the far-end computer for performing data calculation and storage.

8. The interactive system according to claim 6, wherein the first microprocessing unit wirelessly connects with a base station through the wireless communication module, so as to perform a communication service.

9. The interactive system according to claim 1, wherein the first microprocessing unit determines an imaging distance, an imaging size and an imaging transparency of the projected first optical image on the space according to contents of the projected first optical image.

10. The interactive system according to claim 1, further comprising:
a second head mount personal computer, comprising:
a second microprocessing unit, configured to be served as an operation core of the second head mount personal computer;
a second output unit, coupled to and controlled by the second microprocessing unit, configured to project a second optical image onto the space; and
a second image capture unit with a distance detection function, coupled to and controlled by the second microprocessing unit, configured to capture operation gestures on the projected second optical image from a second user wearing the second head mount personal computer,
wherein the second microprocessing unit correspondingly controls operations of the second head mount personal computer in response to the operation gestures on the projected second optical image from the second user.

11. The interactive system according to claim 10, wherein the second head mount personal computer further comprises:
a movement detection unit, coupled to and controlled by the second microprocessing unit, configured to detect the second user's head motion,
wherein the second microprocessing unit is further configured to compensate the second output unit in response the second user's head motion, so as to make the projected second optical image stably project onto the space.

12. The interactive system according to claim 11, wherein the movement detection unit is further configured to detect the second user's eye motion, and the second microprocessing unit is further configured to correspondingly control the operations of the second head mount personal computer in response to the second user's eye motion.

13. The interactive system according to claim 12, wherein the second head mount personal computer further comprises:
a voice recognition unit, coupled to and controlled by the second microprocessing unit, configured to receive and recognize input voices from the second user,
wherein the second microprocessing unit is further configured to correspondingly control the operations of the second head mount personal computer in response to the input voices from the second user.

14. The interactive system according to claim 13, wherein the second microprocessing unit is further configured to correspondingly control the operations of the second head mount personal computer at real time in response to at least one of or a combination of the operation gestures from the second user, the second user's eye motion and the input voices from the second user.

15. The interactive system according to claim 13, wherein the second head mount personal computer further comprises:
a wireless communication module, coupled to and controlled by the first microprocessing unit, configured to make the second head mount personal computer have a wireless connection function.

16. The interactive system according to claim 15, wherein the second microprocessing unit wirelessly connects with a far-end computer through the wireless communication module, so as to use the far-end computer for performing data calculation and storage.

17. The interactive system according to claim 15, wherein the second microprocessing unit wirelessly connects with a base station through the wireless communication module, so as to perform a communication service.

18. The interactive system according to claim 10, wherein the second microprocessing unit determines an imaging distance, an imaging size and an imaging transparency of the projected second optical image on the space according to contents of the projected second optical image.

19. The interactive system according to claim 10, wherein both the first and the second head mount personal computers respectively comprise a wireless communication module for communicating therebetween.

20. The interactive system according to claim 19, wherein the projected first and second optical images on the space are two real or virtual optical images, wherein both the real or virtual optical images are not interfered with one another.

21. The interactive system according to claim 20, wherein the first microprocessing unit becomes a master microprocessing unit when the first head mount personal computer is set to a master device and the second head mount personal computer is set to a slave device, such that the first microprocessing unit is configured to:
control the whole operations of the first and the second head mount personal computers;
make the first and the second users see a same real or virtual optical image; and
control correspondingly the operations of the first and the second head mount personal computers in response to the operation gestures on the same real or virtual optical image from the first user and/or the second user.

22. The interactive system according to claim 20, wherein the second microprocessing unit becomes a master microprocessing unit when the first head mount personal computer is set to a slave device and the second head mount personal computer is set to a master device, such that the second microprocessing unit is configured to:
control the whole operations of the first and the second head mount personal computers;
make the first and the second users see a same real or virtual optical image; and
control correspondingly the operations of the first and the second head mount personal computers in response to the operation gestures on the same real or virtual optical image from the first user and/or the second user.

23. The interactive system according to claim 10, wherein each of the first and the second image capture units further has a variable visual angle function and a variable focal function.

24. The interactive system according to claim 23, wherein each of the first and the second image capture units comprises an active depth camera.

25. A head mount personal computer, comprising:
a microprocessing unit, configured to be served as an operation core of the head mount personal computer;
an output unit, coupled to and controlled by the microprocessing unit, configured to project an optical image onto a space; and
an image capture unit with a distance detection function, coupled to and controlled by the microprocessing unit, configured to capture operation gestures on the projected optical image from a user wearing the head mount personal computer, wherein the microprocessing unit correspondingly controls operations of the head mount personal computer in response to the operation gestures on the projected optical image from the user.

26. The head mount personal computer according to claim 25, further comprising:
a movement detection unit, coupled to and controlled by the microprocessing unit, configured to detect the user's head motion,
wherein the microprocessing unit is further configured to compensate the output unit in response the user's head motion, so as to make the projected optical image stably project onto the space,
wherein the projected optical image on the space is a real or virtual optical image.

27. The head mount personal computer according to claim 26, wherein the movement detection unit is further configured to detect the user's eye motion, and the microprocessing unit is further configured to correspondingly control the operations of the head mount personal computer in response to the user's eye motion.

28. The head mount personal computer according to claim 27, further comprising:
a voice recognition unit, coupled to and controlled by the microprocessing unit, configured to receive and recognize input voices from the user,
wherein the microprocessing unit is further configured to correspondingly control the operations of the head mount personal computer in response to the input voices from the user.

29. The head mount personal computer according to claim 28, wherein the microprocessing unit is further configured to correspondingly control the operations of the head mount personal computer at real time in response to at least one of or a combination of the operation gestures from the user, the user's eye motion and the input voices from the user.

30. The head mount personal computer according to claim 28, further comprising:
a wireless communication module, coupled to and controlled by the microprocessing unit, configured to make the head mount personal computer have a wireless connection function.

31. The head mount personal computer according to claim 30, wherein the microprocessing unit wirelessly connects with a far-end computer through the wireless communication module, so as to use the far-end computer for performing data calculation and storage.

32. The head mount personal computer according to claim 30, wherein the microprocessing unit wirelessly connects with a base station through the wireless communication module, so as to perform a communication service.

33. The head mount personal computer according to claim 25, wherein the microprocessing unit determines an imaging distance, an imaging size and an imaging transparency of the projected optical image on the space according to contents of the projected optical image.

34. The head mount personal computer according to claim 25, wherein the image capture unit further has a variable visual angle function and a variable focal function.

35. The head mount personal computer according to claim 34, wherein the image capture unit comprises an active depth camera.

36. A head mount personal computer, comprising:
a microprocessing unit, configured to be served as an operation core of the head mount personal computer; and
an output unit, coupled to and controlled by the microprocessing unit, configured to project an optical image onto a space,
wherein operation gestures on the projected optical image from a user wearing the head mount personal computer are captured by means of depth detection, such that the microprocessing unit correspondingly controls operations of the head mount personal computer in response to the captured operation gestures on the projected optical image from the user wearing the head mount personal computer.

37. The head mount personal computer according to claim 36, further comprising:
an image capture unit with a distance detection function, coupled to and controlled by the microprocessing unit, configured to capture the operation gestures on the projected optical image from the user, wherein the projected optical image on the space is a real or virtual optical image;
a movement detection unit, coupled to and controlled by the microprocessing unit, configured to detect the user's eye motion, wherein the microprocessing unit is further configured to correspondingly control the operations of the head mount personal computer in response to the user's eye motion; and
a voice recognition unit, coupled to and controlled by the microprocessing unit, configured to receive and recognize input voices from the user, wherein the microprocessing unit is further configured to correspondingly control the operations of the head mount personal computer in response to the input voices from the user.

38. The head mount personal computer according to claim 37, wherein the movement detection unit is further configured to detect the user's head motion, wherein the microprocessing unit is further configured to compensate the output unit in response the user's head motion, so as to make the projected optical image stably project onto the space.

39. The head mount personal computer according to claim 37, wherein the microprocessing unit is further configured to correspondingly control the operations of the head mount personal computer at real time in response to at least one of or a combination of the operation gestures from the user, the user's eye motion and the input voices from the user.

40. The head mount personal computer according to claim 37, further comprising:
a wireless communication module, coupled to and controlled by the microprocessing unit, configured to make the head mount personal computer have a wireless connection function.

41. The head mount personal computer according to claim 40, wherein the microprocessing unit wirelessly connects with a far-end computer through the wireless communication module, so as to use the far-end computer for performing data calculation and storage.

42. The head mount personal computer according to claim 40, wherein the microprocessing unit wirelessly connects with a base station through the wireless communication module, so as to perform a communication service.

43. The head mount personal computer according to claim 37, wherein the image capture unit further has a variable visual angle function and a variable focal function.

44. The head mount personal computer according to claim 43, wherein the image capture unit comprises an active depth camera.

45. The head mount personal computer according to claim 36, wherein the microprocessing unit determines an imaging distance, an imaging size and an imaging transparency of the projected optical image on the space according to contents of the projected optical image.

\* \* \* \* \*